United States Patent [19]

Fretwell

[11] Patent Number: 4,608,045
[45] Date of Patent: Aug. 26, 1986

[54] APPLICATOR FOR IMPRESSING BRANDS OR MEDICAMENTS ON ANIMALS

[76] Inventor: Donald W. Fretwell, 21 Looranah Street, Jindalee, Queensland, 4074, Australia

[21] Appl. No.: 549,491

[22] Filed: Nov. 7, 1983

[30] Foreign Application Priority Data

Nov. 10, 1982 [AU] Australia ................................ PF6737
Dec. 21, 1982 [AU] Australia ................................ PF7362

[51] Int. Cl.⁴ ........................................... A61D 7/00
[52] U.S. Cl. ................................. 604/311; 128/316; 81/9.22
[58] Field of Search .......... 604/310, 311, 183, 184, 604/186, 216, 226, 231, 232, 236; 128/316; 81/9.22

[56] References Cited

U.S. PATENT DOCUMENTS

| 850,357 | 4/1907 | Doyle | 604/311 |
| 2,431,985 | 12/1947 | Bowman et al. | 604/311 X |
| 4,175,704 | 11/1979 | Cohen | 604/216 X |
| 4,230,001 | 10/1980 | Noll et al. | 81/9.22 |
| 4,392,493 | 7/1983 | Niemeijer | 128/316 |

FOREIGN PATENT DOCUMENTS 110725 5/1900 Fed. Rep. of Germany ....... 81/9.22

Primary Examiner—Michael H. Thaler
Attorney, Agent, or Firm—Kimmel, Crowell & Weaver

[57] ABSTRACT

An applicator for impressing brands or medicaments on animals has a handle mounted for movement towards or from an applicator pad containing a liquid chamber communicating with a base, a part of which, having the configuration of the area over which liquid is to be applied to an animal, is liquid-permeable. A liquid container, which may serve as the handle, leads to the liquid chamber by way of a valve mechanism such that each movement of the handle towards the applicator pad as the pad base is pressed on an animal introduces to the liquid chamber liquid under pressure which is expelled through the liquid-permeable part of the applicator pad base.

4 Claims, 4 Drawing Figures

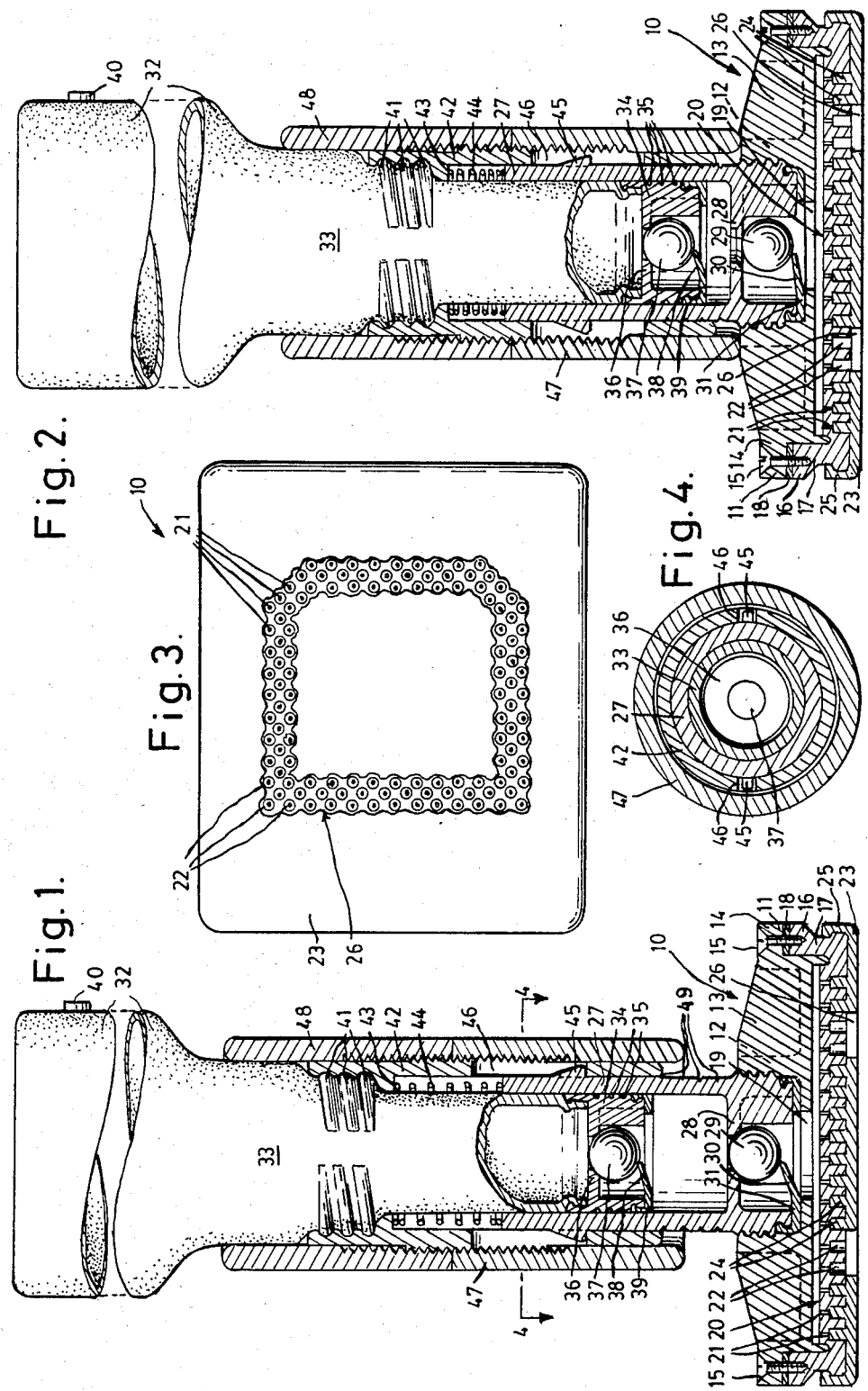

APPLICATOR FOR IMPRESSING BRANDS OR MEDICAMENTS ON ANIMALS

BACKGROUND OF THE INVENTION (1) Field of the Invention

This invention relates to an applicator for impressing brands or medicaments on animals.

(2) Brief Description of the Prior Art

Sheep are customarily branded after shearing by the use of a pigmented liquid or ink formulated for the purpose and normally applied by dipping in the liquid a branding tool carrying the brand in relief and then applying it to the sheep, usually at a shoulder. As the brand requires to be dipped before each application, the procedure is likely to be very laborious and time consuming, and resulting in considerable wastage of the branding liquid.

It is known also to brand cattle with liquid which causes loss of hair in the area to which the liquid is applied, but without the damage to the hide which results from branding with hot branding irons.

It has also been proposed to administer certain medicaments to animals by external application.

SUMMARY OF THE PRESENT INVENTION

A main object of the present invention is to provide an applicator device by means of which branding liquid may be applied to animals to produce clear and precise identifying brands, or treating liquid may be applied externally to animals in predetermined quantities over desired areas, the operation being carried out quickly and easily and with little if any wastage of the liquid used.

Other objects achievable in preferred embodiments of the invention are to provide such a device which is simple and economical to manufacture, compact and convenient to use, capable of being quickly and easily recharged with treating liquid, in which the outline of the brand or applied liquid may be readily changed, and which is sturdy, durable and simple to clean and maintain.

With the foregoing and other objects in view, the invention resides broadly in an applicator for the purpose set out including an applicator pad having a liquid-permeable base for application to an animal; a chamber in the applicator pad communicating with the liquid-permeable base; a handle mounted on the applicator pad for movement towards or from the pad; a container for liquid to be impressed connected to the chamber in the applicator pad; and pressurizing means actuated by movement of the handle towards the applicator pad to pressurize liquid in the chamber so as to expel it through the liquid-permeable base. Preferably the liquid container is a replaceable cartridge or bottle which serves also as the handle, being engaged in a cylinder member leading to the chamber in the applicator pad, the cartridge terminating in a plunger slidable in the cylinder, non-return valve means being provided in the foot of the cylinder and in the plunger.

Other features of the invention will become apparent from the following description.

BRIEF DESCRIPTION OF THE DRAWINGS

In order that a preferred embodiment of the invention may be readily understood and carried into practical effect, reference is now made to the accompanying drawings, wherein:

FIG. 1 is a partly broken-away and sectioned view of an animal branding device according to the invention, FIG. 2 is a similar view of the device in its depressed position for application of a brand, FIG. 3 is a bottom view of the branding pad of the device, and FIG. 4 is a sectional view of the device taken along line 4—4 in FIG. 1.

DETAILED DESCRIPTION OF THE PREFERRED EMBODIMENTS

The animal branding device shown in the drawings has an applicator pad 10 including a body 11, which may be moulded of a suitable plastics material and is rectangular in plan view with a central upstanding hollow and internally threaded boss 12 from which reinforced ribs 13 radiate to a raised periphery 14. Screws 15 secure the body's periphery to the raised edge 16 of a base plate 17, which may also be of moulded plastics material, a sealed gasket 18 being interposed between the peripheral parts of the body and base plate. A central liquid inlet 19 at the bottom of the boss 12 leads into a liquid dispersal chamber 20 between the bottom of the body 11 and the base plate 17.

The base plate 17 is liquid-permeable, the liquid dispersal chamber 20 communicating by way of passages 21 with a multiplicity of feed holes 22 opening through the bottom of the base plate in regularly spaced arrangement.

A stencil sheet 23, of a moulded resiliently flexible plastics material, is removably applied to the base plate 17, being formed with a multiplicity of cylindrical plugs 24 which fit closely in, and close, the feed holes 22 of the base plate, a raised and beaded edge 25 of the stencil sheet snapping into engagement with a peripheral groove in the sides of the base plate. As shown in FIG. 3, a required brand may be cut from the stencil sheet 23, its removal unblocking the feed holes 22 within the outline of the brand which is then defined by a channel 26 having the depth of the stencil sheet.

A cylinder 27, which may be of moulded plastics material, has a threaded lower part which is screwed into the boss 12 of the applicator pad. Within this cylinder, bear to its lower end, there is formed a seating 28 for a ball foot valve 29 biased to its seating by a leaf spring 30 formed as part of a cap 31 of resiliently flexible plastics material and snapped onto the bottom of the cylinder 27.

It will be apparent that branding liquid supplied to and pressurized in the cylinder 27 will be forced past the ball valve 29 and through the liquid inlet 19 to the dispersal chamber 20, and thence through passages 21 and the unblocked feed holes 22 to the channel or channels 26 defining the brand to be applied.

The branding liquid is supplied to and pressurized in the cylinder 27 by a liquid container or branding ink cartridge 32 which may consist of a blow-moulded plastics bottle having an elongated neck 33. On the mouth of this neck there is snap-fitted a plunger 34 which, with part of the neck 33, is fitted closely but slidably in the cylinder 27. The plunger 34, which is made with circumferential sealing grooves 35, has an internal valve seating 36 normally closed by a plunger ball valve 37 biased to closed position by a lead spring 38 forming part of a cap 39 snap fitted onto the plunger. As the ink cartridge 32 and the attached plunger 34 are raised in the cylinder 27 to the position shown in FIG. 1, the foot vavle 29 being closed, liquid is drawn suctionally from the ink cartridge 32 past the plunger valve 37 into the lower part of the cylinder 27, an air bleed valve 40 of any suitable type in the upper part of the inverted cartridge bottle allowing inflow of air but preventing outflow of the branding liquid. When the ink cartridge 32 is depressed in the cylinder 27, as shown in FIG. 2, the plunger valve 37 is closed and the foot valve 29 is forced open to allow the liquid to flow to the dispersal chamber 20 and the brand outline channel 26.

Threads 41 formed on the cartridge neck 33 are engaged in the internally threaded upper part of a sleeve 42 slidable on the cylinder 27 and formed, near its top, with an internal annular shoulder 43. A helical compression spring 44 between the top of the cylinder 27 and the internal shoulder 43 of the sleeve 42 biases the sleeve, and therefore the ink cartridge 32 screwed into it, to the raised position shown in FIG. 1. The cylinder 27 has a pair of opposed lugs 45 extending outwardly into a pair of diametrically opposed longitudinal slots 46 in the sleeve 42 to prevent rotation of the sleeve, and to limit its upward movement, relative to the cylinder.

Part of the sleeve 42 is externally threaded, and a cylindrical stop nut 47 is screwed onto the lower part of the sleeve, a cylindrical lock nut 48 being screwed onto the upper part to hold the stop nut in threadedly adjusted position. The stop nut 47, by contacting the boss 12 of the brand pad 10, limits the downward movement of the sleeve 42, cartridge 32 and plunger 34 relative to the applicator pad 10 and thus the volume of liquid expelled from the cylinder 27 on the down stroke of the cartridge. To facilitate the adjustment of the stop nut, the lower part of the cylinder 27 has calibrated peripheral grooves 49 or other markings.

The ink cartridge or bottle 32 is filled with branding ink of approved type, and sealed at the mouth by the spring-loaded plunger valve 37. If desired the mouth may be further protected by any suitable cap (not shown) for example a closure cap screwed onto the threads 41. The cartridge, after removal of any such protective cap, is inverted and screwed into the threaded upper part of the sleeve 42, and then serves as a handle for the device. With the applicator pad 10 placed on a piece of waste material, the cartridge 32 is once or twice depressed and permitted to rise so that the applicator pad becomes charged with the branding ink, after which the device is ready for use. A user, holding the cartridge 32 as a handle, presses the applicator pad 10 firmly on the animal so that the stop nut 47 is brought down onto the branding pad boss 12, causing branding ink to fill the channel 26 in the form of the selected brand, which is clearly imprinted on the skin of the animal. When the pressure so applied is relieved, the spring 44 causes the applicator pad to descend relative to the cartridge 32 so that a further metered supply of the branding liquid is drawn into the cylinder 27. When the supply of branding liquid in the cartridge has been exhausted, the cartridge may be quickly unscrewed and withdrawn and replaced by a further charged cartridge.

A digital counting device (not shown) of wellknown type may be mounted on the applicator pad body 11 in the space between reinforcing ribs 13 and automatically actuated each time the stop nut 47 is brought down to the branding pad boss 12, so that a tally may be kept of the number of animals branded.

The cartridge 32 may contain liquid other than branding ink. For example it may be charged with liquid raddle for the temporary marking of sheep or cattle.

In a modified form of the invention, the ink cartridge is replaced by an adaptor (not shown) generally similar to the neck 33 of the cartridge 32 before described and illustrated and connected by a hose to an elevated bulk storage container for the liquid, which is fed gravitationally through the hose to the adaptor, and then, as before described, to the applicator pad 10. In this case, the stop nut 47 and lock nut 48 serve as a handle for the device, or the adaptor may have an upward extension for this purpose.

In another application, the device may be used advantageously for the application to animals of medicaments and other treating liquids which, applied to a suitable area of an animal's skin, will gradually disperse over a wide area or may be absorbed. For such a purpose, the stencil sheet 23 may be removed from the applicator pad, or one or more holes of desired size and arrangement may be formed through the sheet.

The device may be quickly and easily dismantled for cleaning and maintenance, and readily reassembled, and will in all respects be found to be very effective in achieving the objects for which is has been devised. It will, of course, be understood that the particular embodiment of the invention herein described and illustrated may be subject to many modifications of constructional detail and design, which will be readily apparent to skilled persons, without departing from the scope and ambit of the invention hereinafter claimed.

I claim:

1. An applicator for impressing liquid brands or medicaments on animals including:
    an applicator pad having a liquid permeable base free of any needles for surface application to an animal,
    a chamber in the applicator pad communicating with the liquid-permeable base,
    a cylinder leading by way of a first non-return valve to the chamber,
    a replaceable liquid cartridge comprising a body serving as a handle for the applicator, and a neck slidable in the cylinder as a plunger, a second non-return valve normally closing a liquid outlet from the neck and adapted, when the plunger is retracted in the cylinder, to unseat allowing passage of fluid from the cartridge to the cylinder and, when the plunger is advanced in the cylinder, to close and force liquid from the cylinder, unseating the first non-return valve, and into the chamber in the applicator pad,
    the liquid cartridge being screw threadedly engaged in a sleeve slidable but non-rotatable on the cylinder,
    adjustable stop means being provided for said sleeve,
    said adjustable stop means including a stop nut threadedly engaged on the sleeve which when the plunger is in its advanced position abuts the applicator pad,
    the liquid-permeable base being liquid-permeable by virture of a plurality of holes therethrough, and
    a multiplicity of removable plugs blocking the holes whereby when appropriate plugs are removed, a flow of liquid can occur in a desired outline.

2. An applicator according to claim 1 wherein:
    there is applied to the liquid-permeable base a stencil sheet formed with said multiplicity of plugs entering and blocking certain of the holes through the base and with a part excised to form at least one channel into which the remainder of the said holes lead and defining the configuration of the area over which liquid is to be surface applied to an animal.

3. An applicator according to claim 1 wherein:
spring loading means urge the sleeve and the cartridge engaged therewith to retracted position, and lugs limit the retraction of the sleeve on the cylinder.

4. An applicator according to claim 1 wherein:
the stop nut limiting the advance of the sleeve on the cylinder is adjustable and adapted to vary the stroke of the handle and associated plunger relative to the cylinder.

* * * * *